US006240794B1

(12) United States Patent
Simon

(10) Patent No.: US 6,240,794 B1
(45) Date of Patent: Jun. 5, 2001

(54) CRANK ASSEMBLY

(76) Inventor: Istvan Simon, Rosengässchen 7, 8200 Schaffhausen (CH)

( * ) Notice: Subject to any disclaimer, the term of this patent is extended or adjusted under 35 U.S.C. 154(b) by 0 days.

(21) Appl. No.: 09/294,527

(22) Filed: Apr. 20, 1999

(30) Foreign Application Priority Data

Apr. 22, 1998 (CH) .......................................... 1998 0916/98

(51) Int. Cl.[7] ............................ F16H 37/12; F16H 21/22
(52) U.S. Cl. ............................................ 74/52; 74/44
(58) Field of Search .................................. 74/44, 50, 52, 74/63, 602, 69, 68, 54; 123/545, 197 R, 197.4, 196 R, 198 C, 509; 92/140, 146

(56) References Cited

U.S. PATENT DOCUMENTS

| 2,140,127 | * | 12/1938 | Chancellor | 74/52 |
| 2,506,693 | * | 5/1950 | Voisin | 74/52 |
| 3,886,805 | * | 6/1975 | Koderman | 74/52 |
| 3,971,261 | * | 7/1976 | Matsushita | 74/52 |
| 4,073,196 | * | 2/1978 | Dell | 74/52 |
| 4,152,955 | | 5/1979 | McWhorter . | |
| 5,465,648 | * | 11/1995 | Cy | 74/52 |
| 5,964,198 | * | 12/1938 | Wu | 123/196 R |

FOREIGN PATENT DOCUMENTS

| 471253 | | 2/1947 | (BE) . |
| 3736527 | * | 7/1861 | (DE) . |
| 2616372 | * | 11/1977 | (DE) . |
| 3927535 | | 3/1991 | (DE) . |
| 1727 | * | of 1861 | (GB) . |
| 8804356 | | 6/1988 | (WO) . |

OTHER PUBLICATIONS

Patent Abstracts of Japan, vo. 007, No. 081 (M–205) Apr. 5, 1983 & JP 008233 (Isamu Nemoto), Jan. 18, 1983.

* cited by examiner

*Primary Examiner*—David A. Bucci
*Assistant Examiner*—Marcus Charles
(74) *Attorney, Agent, or Firm*—Bachman & LaPointe, P.C.

(57) ABSTRACT

A crank assembly for a piston machine having at least one piston reciprocable in a cylinder and a piston rod connecting the piston to the crank assembly for converting the reciprocating movement of the piston into a rotary movement of the crank assembly or vice-versa. The crank assembly includes two shafts in mutually coaxial relationship. Their mutually opposite shaft ends leave a spacing between them. Between the shaft ends the end of the connecting rod is arranged supported on both sides and movably at a spacing around the coaxial axes of the shafts on a circular path, and is in rotational engagement with the shaft ends on both sides by way of pairs of gear wheels.

4 Claims, 6 Drawing Sheets

CRANK ASSEMBLY

FIELD OF THE INVENTION

The invention concerns a crank assembly for a piston machine.

In this specification a piston machine may include for example an internal combustion engine, a piston-type compressor, a piston-type pump and like machines involving a reciprocating piston.

BACKGROUND OF THE INVENTION

The term crank assembly is generally used to denote a connecting arrangement which is substantially in the form of a shaft assembly provided with offset crank portions, the purpose thereof being to transmit a force such as a drive force applied thereto at one location to a load connected thereto at another location. A distinction can be drawn between what can be referred to as horizontal crank assemblies and what can be referred to as vertical crank assemblies. If a power source such as a motor or engine is stationary with respect to the crank assembly and if a rotary movement is transmitted at the end from the output member of the power source to the crank assembly then such a design configuration is embraced by the term horizontal crank assembly, An example of this would be a crank assembly which is directly flange-mounted to the drive shaft of an electric motor. If in contrast the output of a drive assembly rotates about the horizontal, that is to say the longitudinal axis of a crank assembly, then that configuration is referred to by the designation vertical crank assembly. A drive arrangement of that kind would be for example a reciprocating piston engine whose piston rod or connecting rod moves around the crank assembly at one end in engagement with the offset crank portion of the crank assembly.

Crank assemblies are subjected to loadings resulting in flexural, torsional and oscillatory stresses. Oscillations for example progressively damage and destroy the structure of the material constituting the crank assembly and give rise to fatigue phenomena which ultimately can result in fracture of the crank assembly material. In order to obviate such fatigue fractures, crank assemblies can be provided with suitable devices, the purpose of which is to damp the oscillations involved. Suitable forms of mountings are increasingly used to counteract flexural phenomena while remedies are sought to counteract torsional phenomena in respect of the crank assemblies by virtue of a particular design configuration in respect of parts which trigger off inertia forces. In other respects crank assemblies are also characterized by the fact that the concentric portion of the crank assembly, more specifically the successively occurring drive input and drive output ends and the main bearing journals, and the eccentric portion of the crank assembly, more specifically the offset crank portions or crank throws and the crank journals, rotate at the same speed of rotation. When the concentric or the eccentric portion of the crank assembly is being driven, there is no possibility of causing the respective other portion of the crank assembly to rotate at a different speed. namely higher or lower.

SUMMARY OF THE INVENTION

An object of the present invention is to provide an improved crank assembly which is less subject to the above-outlined limitations.

Another object of the present invention is to provide a crank assembly for a piston machine which is of a more flexible structure whereby forces acting thereon give rise to reduced detrimental effects thereon.

Still another object of the present invention is to provide a crank assembly for a piston machine, which affords variability in terms of the relationship between movements of the piston of the machine and the rotation of the crank assembly.

In accordance with the principles of the present invention the foregoing and other objects are achieved by a crank drive assembly for a piston machine such as an internal combustion engine, a piston compressor, a piston pump or the like comprising at least one cylinder with a piston reciprocable in the cylinder for performing stroke movements of given respective lengths. A piston rod connects the piston to the crank assembly which is operative for converting the reciprocating movements of the piston in the cylinder into a rotary movement of the crank assembly or vice-versa. The crank assembly includes first and second shafts which extend in mutually coaxial relationship, each having shaft ends which are disposed in mutually opposite relationship leaving a spacing between them. Arranged between the shaft ends is the end of the connecting rod, being supported at both sides thereof and being movable on a circular path at a spacing around the coaxial axes of the first and second shafts. The connecting rod end is adapted to be in rotational engagement with said shaft ends on both sides by way of pairs of gear wheels.

Further preferred features of the invention are set forth hereinafter.

Further objects, features and advantages of the invention will be apparent from the description hereinafter of a preferred embodiment thereof.

DESCRIPTION OF A PREFERRED EMBODIMENT

Figure 1:
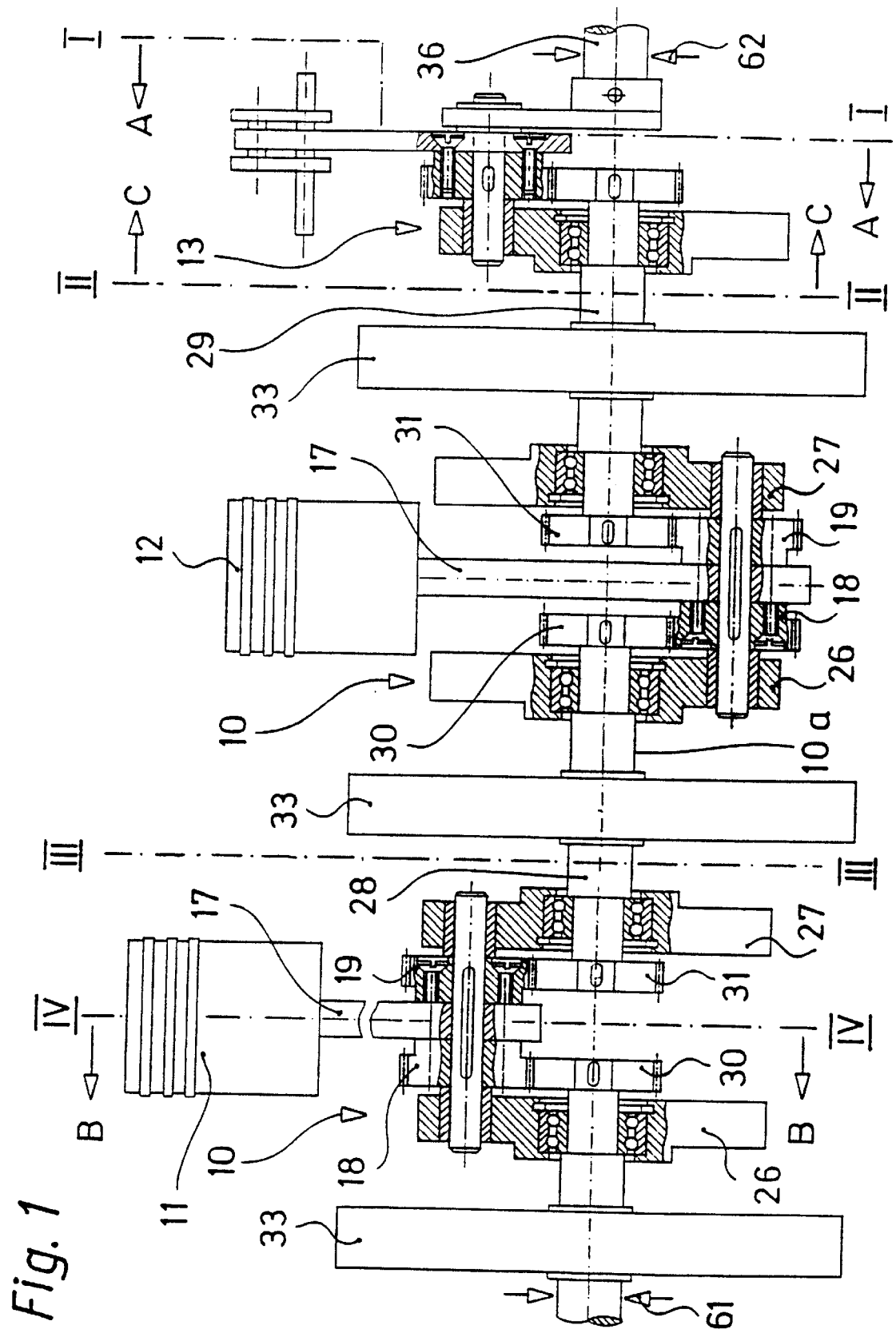
FIG. 1 is a partly sectional side view of a crank assembly in accordance with the invention, co-operating with two piston rods and with a lever drive arrangement disposed at one end on the crank assembly.

Referring firstly to FIG. 1. shown therein are two mutually adjacent crank assemblies 10 for use in a piston machine such as an internal combustion engine, a piston compressor or a piston pump, with the adjacent crank assemblies 10 being connected together by way of a common shaft indicated at 10a. The illustrated arrangement which thus constitutes a double-crank assembly co-operates with respective pistons 11 and 12 displaceable in respective cylinders (not shown in FIG. 1 but one thereof being shown in FIG. 5) and piston or connecting rods 17 which are pivotably connected thereto in order thereby to connect each piston to its respective crank assembly to provide for conversion of the reciprocating movements of the respective piston in its cylinder into a rotary movement of the crank assembly or vice-versa according to the operating situation of the crank assembly.

Reference numeral 13 in FIG. 1 denotes a lever drive arrangement which, as a feature of a structure according to the invention, serves to increase output drive speeds of the crank assembly 10.

Figure 4:
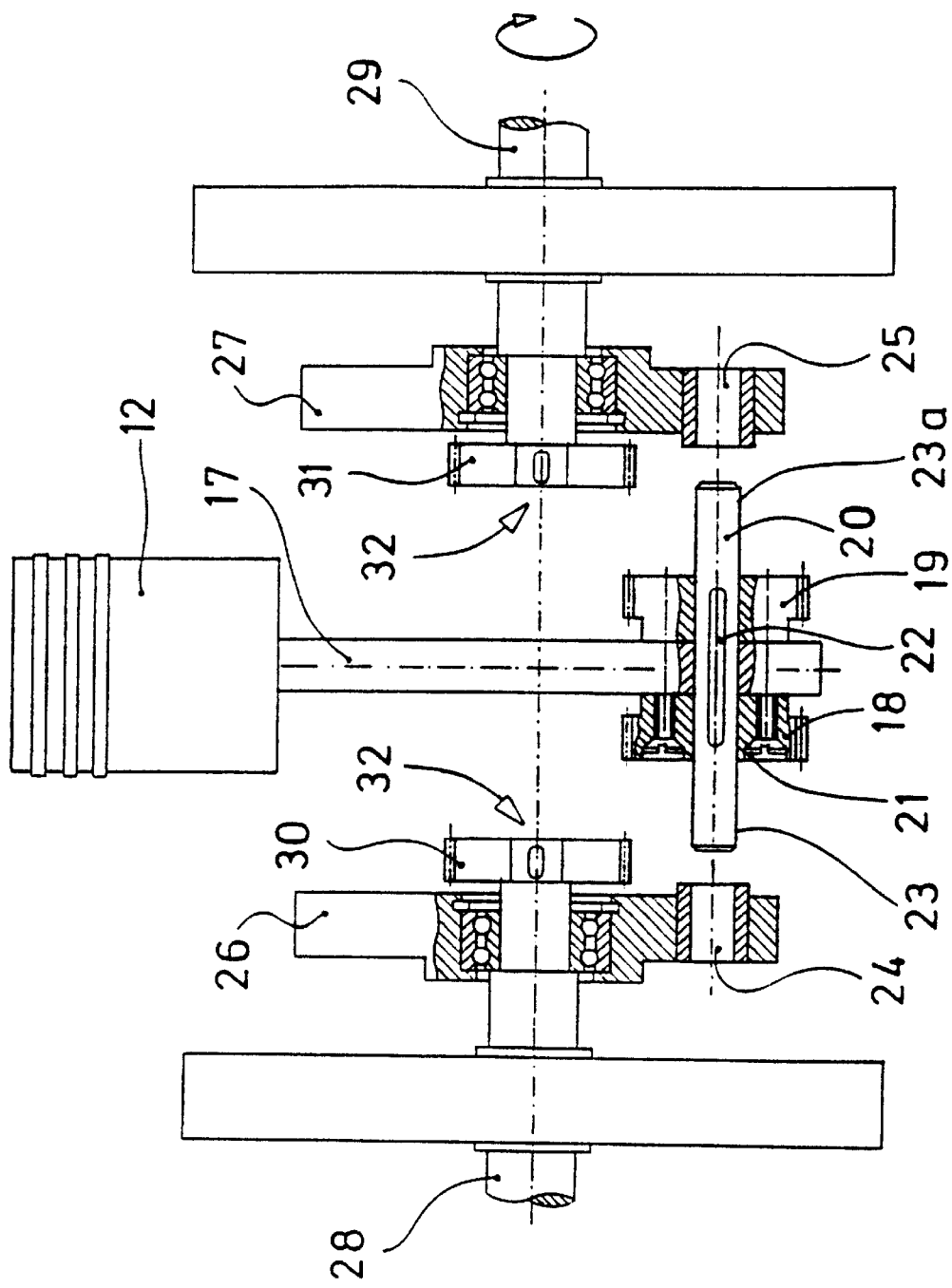
FIG. 4 shows a partly sectional side view in an exploded condition of a part of the crank assembly shown in FIG. 1 in the portion between section lines II/II–III/III therein.

Reference will now be made to FIG. 4 to describe the crank assembly 10 in accordance with the invention, FIG. 4 being a diagrammatic view of part of the crank assembly 10. The piston 12 which is slidable in the cylinder 15 co-operates with a piston rod or connecting rod 17 which at one end, that is to say at its end towards the piston, is connected to the piston 12 by a gudgeon pin indicated at 34 in FIG. 5, in such a way as to be pivotable relative to the piston 12 in a plane of pivotal movement which is perpendicular to the plane of the drawing in FIG. 4. At the other end, that is to say at its end remote from the piston 12, the piston rod 17 carries a pair of gears comprising drive gears 18 and 19 having teeth on their peripheral surfaces, and a support shaft indicated at 20 which extends through the gears 18 and 19. It will be seen from FIG. 4 that the gears 18 and 19 are each simply arranged in mutually opposite relationship on the respective sides of the piston rod 17, which are parallel to the plane of pivotal movement of the piston rod 17 with respect to the piston 12. The gears 18 and 19 are connected in mutually concentric relationship fixedly to the piston rod 17, for example by screw means indicated at 21. Extending through the axial center of the gears 18 and 19 is the support shaft 20 which is prevented from rotating with respect to the gears 18 and 19 and the free end of the piston rod 17, for example by means of a key indicated at 22.

The shaft 20 has respective projecting end portions 23 and 23a which engage into respective bushes 24 and 25, with the end portion 23 engaging into the bush 24 and the end portion 23a engaging into the bush 25. The end portions 23 and 23a are rotatably mounted in the respective bushes 24 and 25, in which respect reference may be made to FIG. 1 showing the assembled condition of the components illustrated in an exploded view in FIG. 4.

The bushes 24 and 25 are in turn individually accommodated in rotary carriers 26 and 27, with the bush 24 received in the carrier 26 and the bush in the carrier 27. The bushes 24 and 25 are disposed in the carriers 26 and 27 on circles whose radius from the center line of the shafts 28 and 29 is determined in accordance with half the diameter of a drive gear 18, 19 and a driven gear 30. 31, in dependence on the length of a stroke travel of the piston 11 or 12, this therefore involving the eccentricity in question, that is to say the spacing of the common center line of the drive gears 18. 19 and the support shaft 20 relative to the center line constituted by the axis of rotation of the shafts 28 and 29.

The carriers 26, 27 are arranged rotatably on the shafts 28, 29 by means of roller bearings and the above-mentioned driven gears 30, 31 are fixedly mounted, for example by means of a key or spline connection, to the free end portions 32 of the shafts 28 and 29, being the end portions which face towards the piston rod 17 at respective sides thereof. FIG. 1 which shows the crank assembly 10 in the assembled condition makes it clear that the free end of the piston rod 17 is disposed between the two shafts 28, 29 which extend in coaxial relationship, extending in succession in the same direction as each other, having mutually oppositely disposed shaft end portions leaving between them a spacing in which the free end of the connecting rod 17 is disposed, and that the end of the connecting rod 17 between the facing end portions of the shafts 28 and 29 is fixedly connected to the two concentric spaced gears 18 and 19. The support shaft 20 which extends axially through the gears 18 and 19 and the free end of the piston rod 17 is non-rotatably engaged in the piston rod 17 and the gears 18 and 19 while the free ends 23 and 23a of the support shaft 20 are rotatably carried in the respective bushes 24 and 25 which in turn are accommodated in the disk-shaped carriers 26 and 27 which in turn are freely rotatably carried on the respective shafts 28 and 29. Finally the gears 18 and 19 have their external teeth in rotational engagement with externally toothed gears 30 and 31 which are fixedly and thus non-rotatably carried on the shafts 28 and 29.

The basic structure of the crank assembly 10 according to the invention having been outlined above the mode of operation thereof will now be described. If rotary movement of the crank assembly 10 is caused by a reciprocating movement of a piston 11 reciprocable in a cylinder as indicated for example at 15 in FIG. 5, then the free end of the piston rod 17 that is remote from the piston, as the piston moves from a top dead center point downwardly by way of a bottom dead center point and back to the top dead center point again, describes a movement on a circular path around the shafts 28 and 29 at a spacing around the coaxial axes thereof, with the radius of that circular path being determined in accordance with the length of the stroke travel of the piston and derived therefrom in accordance with the sum of half the diameter of a drive gear 18 and a driven gear 30. The drive gears 18 and 19 and the support shaft 20 also move with the associated end of the connecting rod 17 on the same circular path, with the free end of the piston rod 17 being rotatably supported with the support shaft 20 and the gears 18 and 19 at both sides thereof in the carriers 26 and 27 by way of the free end portions 23 and 23a of the support shaft 20. In the course of a rotational movement, the carriers 26 and 27 are caused to rotate about the shafts 28 and 29 by way of the free end portions 23 and 23a of the support shaft 20, said ends being rotatably supported in the carriers 26 and 27. Therefore the location at which the free end of the piston rod 17, that carries the gears 18 and 19 is supported, follows the circular movement of the free end of the piston rod 17. In the course of that circular or rotational movement, the gears 18 and 19 which themselves are not rotatable in relation to the connecting rod 17 move around the driven gears 30, 31 which are arranged fixedly on the shafts 28 and 29 in concentric relationship with the longitudinal axis thereof, and drive them with the shafts 28 and 29. That rotary movement can thus be taken off at an end of the shafts 28 and 29, which is intended for that purpose.

FIGS. 1 and 4 show gears, namely the drive gears 18 and 29 and the driven gears 30 and 31, which are of the same size, therefore affording a 1:1 transmission ratio. That provides that, in a complete reciprocating movement of the pistons 11 and 12, that is to say from top dead center to bottom dead center and back to top dead center again, the shafts 28 and 29 rotate twice. It will be appreciated however that the gear pairings as between the gears 18 and 19 and the driven gears 30 and 31 are not limited to a 1:1 transmission ratio for, depending on the number of revolutions required in respect of the shafts 28 and 29 in the course of a complete reciprocating movement of the pistons 11 and 12, it is possible to use suitable gear pairings with appropriate transmission ratios, having regard to the piston stroke travel lengths that are to be observed.

Figure 5:
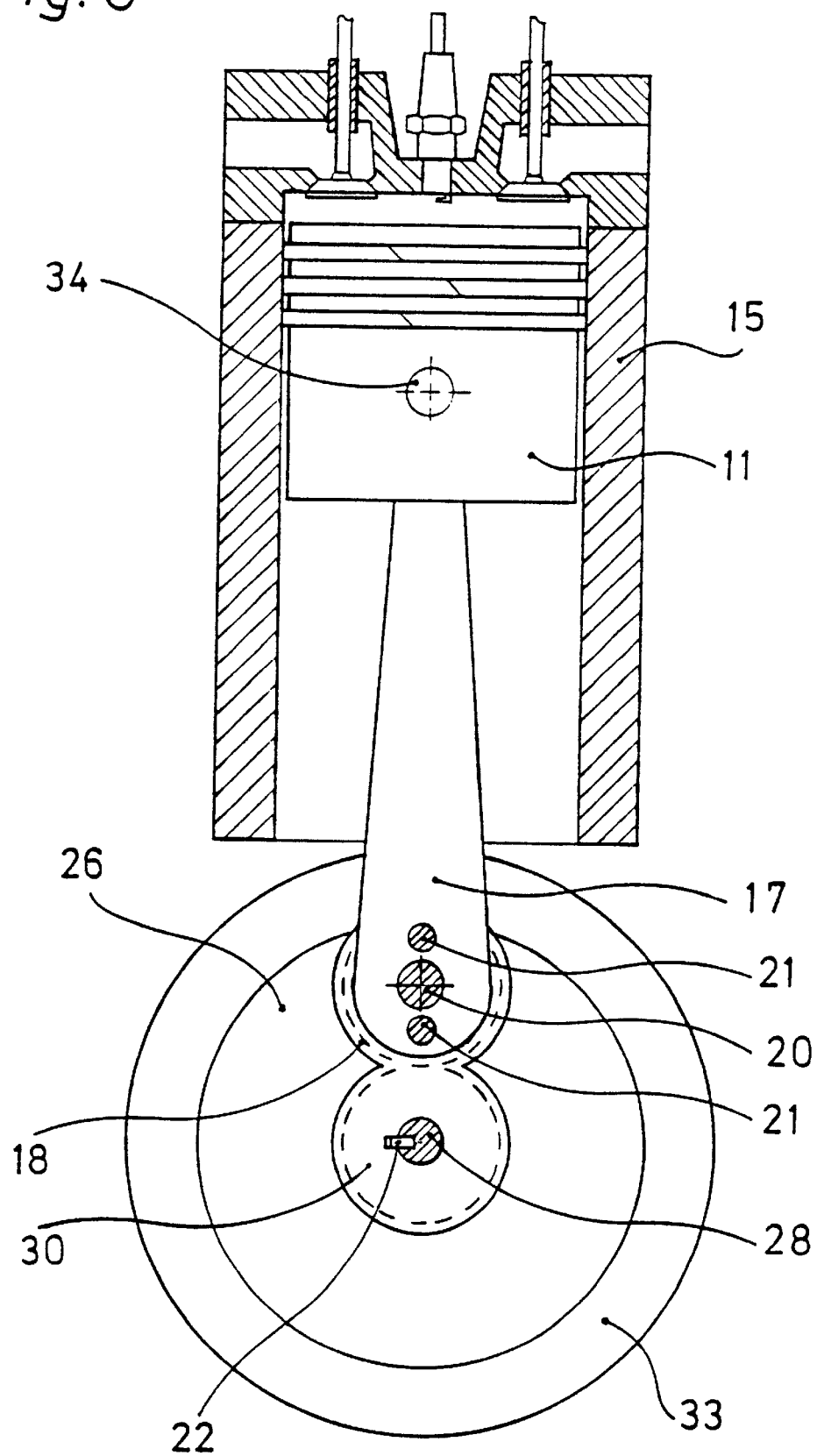
FIG. 5 is a view partly in section taken along line IV/IV in the FIG. 1 view looking in the direction of the arrow B therein, with the addition of a cylinder that is not shown in FIG. 1.

It will be further appreciated that hereinbefore the mode of operation of the crank assembly 10 according to the invention was described in terms of operation in connection with a drive piston, for example as in the case of an internal combustion engine, as with the diagrammatic view of the cylinder 15 in FIG. 5. It will be seen therefore that, without structural alterations in the crank assembly 10 according to the invention as described, it can also be driven directly by driving a shaft 28 or 29 in order to cause displacement of the piston or pistons 11, 12. In that case, the gears 18 and 19 which constitute driving gears in FIG. 4 become driven gears and the driven gears 30 and 31 in FIG. 4 become driving gears.

The shafts 28 and 29 preferably carry flywheels as indicated at 33 for example in FIG. 1 in order to balance out the movements of the crank assembly 10, in particular the movements of the pistons 11 and 12.

Reference will now again be made to FIG. 1 showing that the shaft 29 carries the above-mentioned lever drive arrangement 13 which connects the shaft 29 to an output drive shaft 36. The lever drive arrangement 13 will now be described with reference to FIG. 2.

The lever drive arrangement 13 includes a mounting disk 37 which is freely rotatably supported on the shaft 29 and a rotary body 38 which is supported at the free drive end portion 39 of the shaft 29, being fixed thereon by means of a key as indicated at 14. It will be seen from FIG. 2 that the drive output shaft 36 and the shaft 29 are separate from each other in terms of shafts, but they are operatively connected by way of a drive lever 40 fixed on the shaft 36, to a journal 41 arranged at its free end and extending towards the left in FIG. 2 to a position in alignment with the mounting disk 37, and by way of an externally toothed driver 42 to the toothed rotary body 38 and thus the mounting disk 37, with the driver 42 being fixedly connected to a carrier arm 43 which in turn is supported at a support unit 44. As shown in simplified form the lever drive arrangement 13 includes a driving portion 45 and a driven portion 46. The driving portion 45 includes the mounting disk 37 freely rotatably carried on the shaft 29, with a bearing means 47 which extends axially through the mounting disk 37 at a radial spacing relative to the axis of the mounting disk 37. the purpose of the bearing means 47 being to rotatably accommodate and at the same time support in the mounting disk 37 the free end, which is towards the drive assembly, of the journal 41 as a component of the driven portion 46. Projecting radially from the drive output shaft 36, the drive lever 40 is connected to the end of the drive output shaft 36. At its free end which projects from the drive output shaft 36, the drive lever 40 carries the journal 41 which extends in parallel relationship with and at a radial spacing from the axes of the shaft 29 and the drive output shaft 36. The journal 41 is mounted at one end, being the end towards the drive output shaft 36, on the drive lever 40 while at its other end it is supported in the mounting disk 37 by way of the bearing 47. Following the drive lever 40 in a direction towards the mounting disk 37 the journal 41 non-rotatably engages through the free end of the arm 43, being the end remote from the support unit 44. The driver 42 is so arranged on the journal 41, between a face 48 of the mounting disk 37 and the side 49 of the carrier arm 43. which is opposite to the disk face 48, in such a way that the driver 41 and the rotary body 38 are in operative engagement with each other. The sum of half the diameters of the rotary body 38 and the driver 42 determines the spacing between the longitudinal axis of the shaft 29 and that of the journal 41. that is to say the radius of the circular path on which the journal 41 moves around the longitudinal axis of the shaft 29. The driver 42 is fixedly connected by way of one of its faces to the side 49 of the carrier arm 43, as by screw means 50. and equally the driver 42 is prevented from rotating about the journal 41 by way of a spline or key connection as diagrammatically indicated at 51. Thus by way of its screw means 50 and the key 51 the driver 42 fixes the free or downward end in FIG. 2 of the carrier arm 43 to the journal 41, although the latter can rotate in the bush 47 and in the drive lever 40.

The end of the carrier arm 43 which is remote from the driver 42 is accommodated between the ends 54 of first and second lever arms 56 and 57 pivotably about a holder 55 while the other ends of the lever arms 56, 57 are pivotably mounted to a stationary support 58 which for example is stationarily mounted to a part of the machine structure. The unit 44 which includes first and second lever arms 56, 57 which are arranged in parallel spaced relationship at one end pivotably about a stationary support 58 and for that purpose being of a freely cantilevered configuration, and at the other end pivotably accommodating the carrier arm 43 between them, fixes the end 54 of the carrier arm 43 in such a way that the driver 42, non-rotatably fixed to the arm 43, can move around the rotary body 38.

When the rotary body 38 is driven, its rotary movement can cause the driver 42 to move around its outside periphery, that is to say the rotary body 38 and the driver 42 roll against each other. During that movement the journal 41, supported in the freely rotating mounting disk 37, also moves around the rotary body 38. The journal 41, by way of the drive lever 40, transmits that motion in the form of a rotational movement to the drive output shaft 36.

When that circulatory movement of the driver 42 about the rotary body 38 takes place, the carrier arm 43 performs the function of keeping the driver 42 in a guided condition and in engagement as it moves around the rotary body 38.

Figure 2:
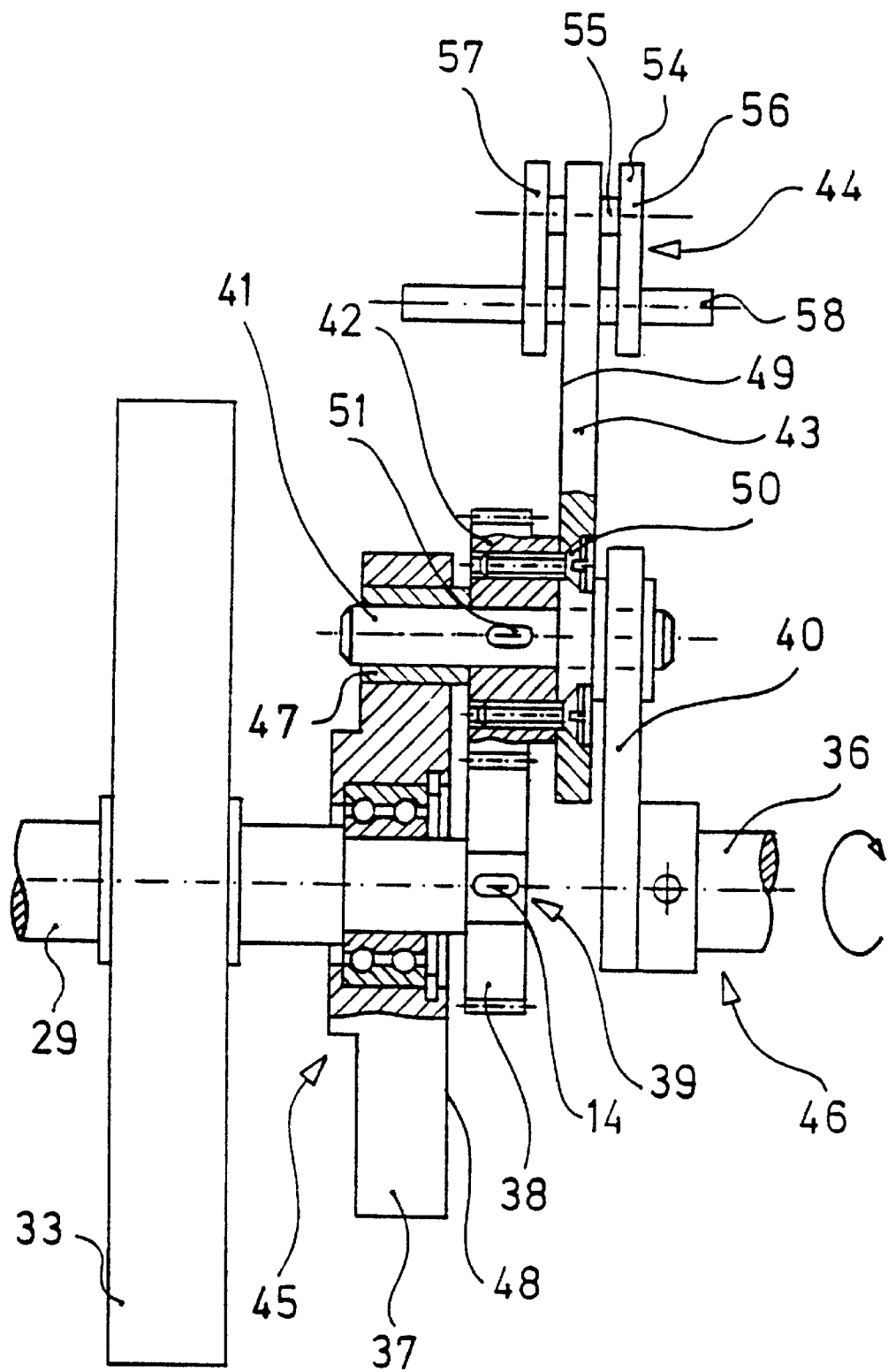
FIG. 2 is an individual side view of the lever drive arrangement shown in FIG. 1 in the portion between section lines I/I–II/II therein.
Figure 3:
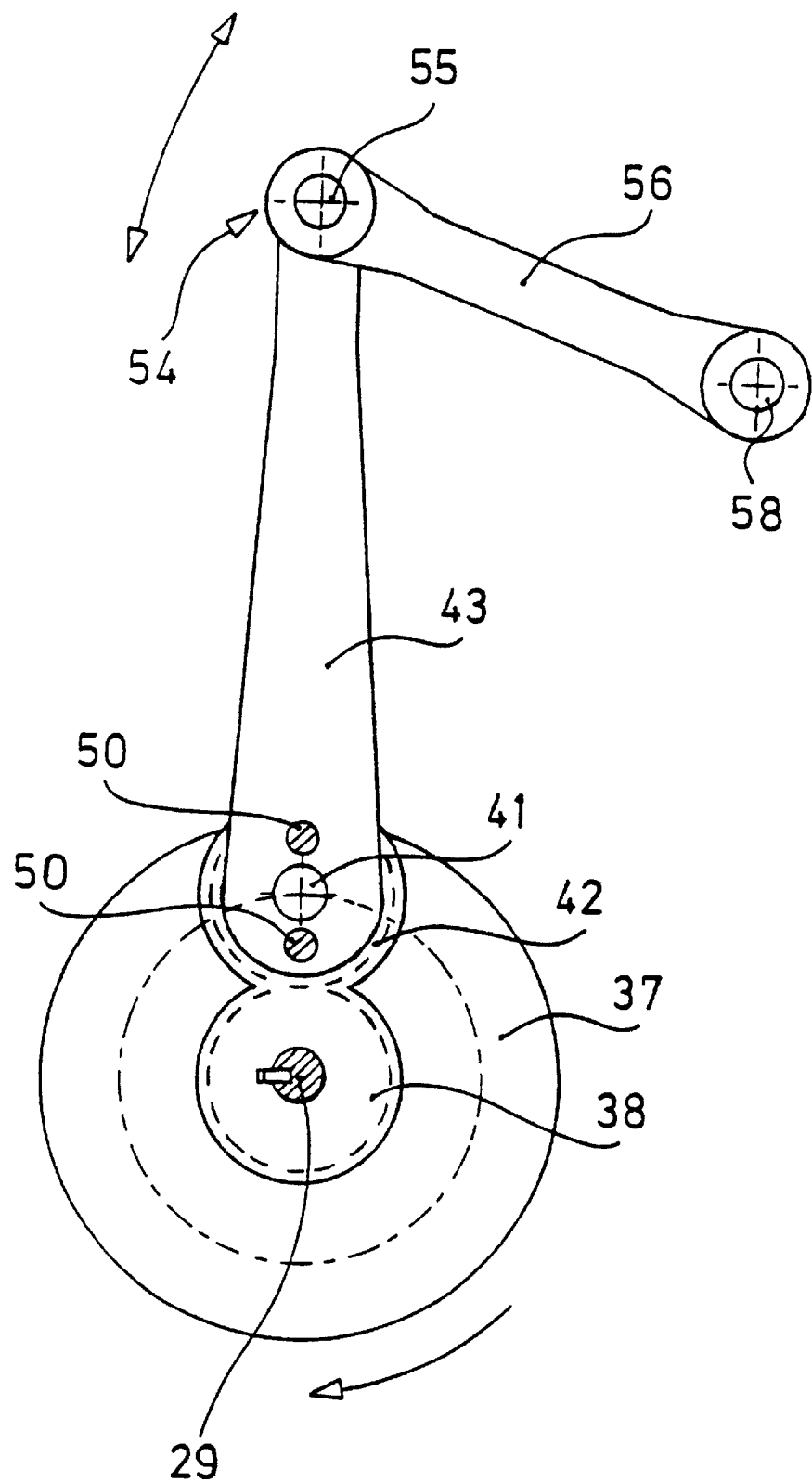
FIG. 3 shows a front view of the lever drive assembly of FIG. 2, viewing in the direction of the arrow A in FIG. 1.
Figure 6:
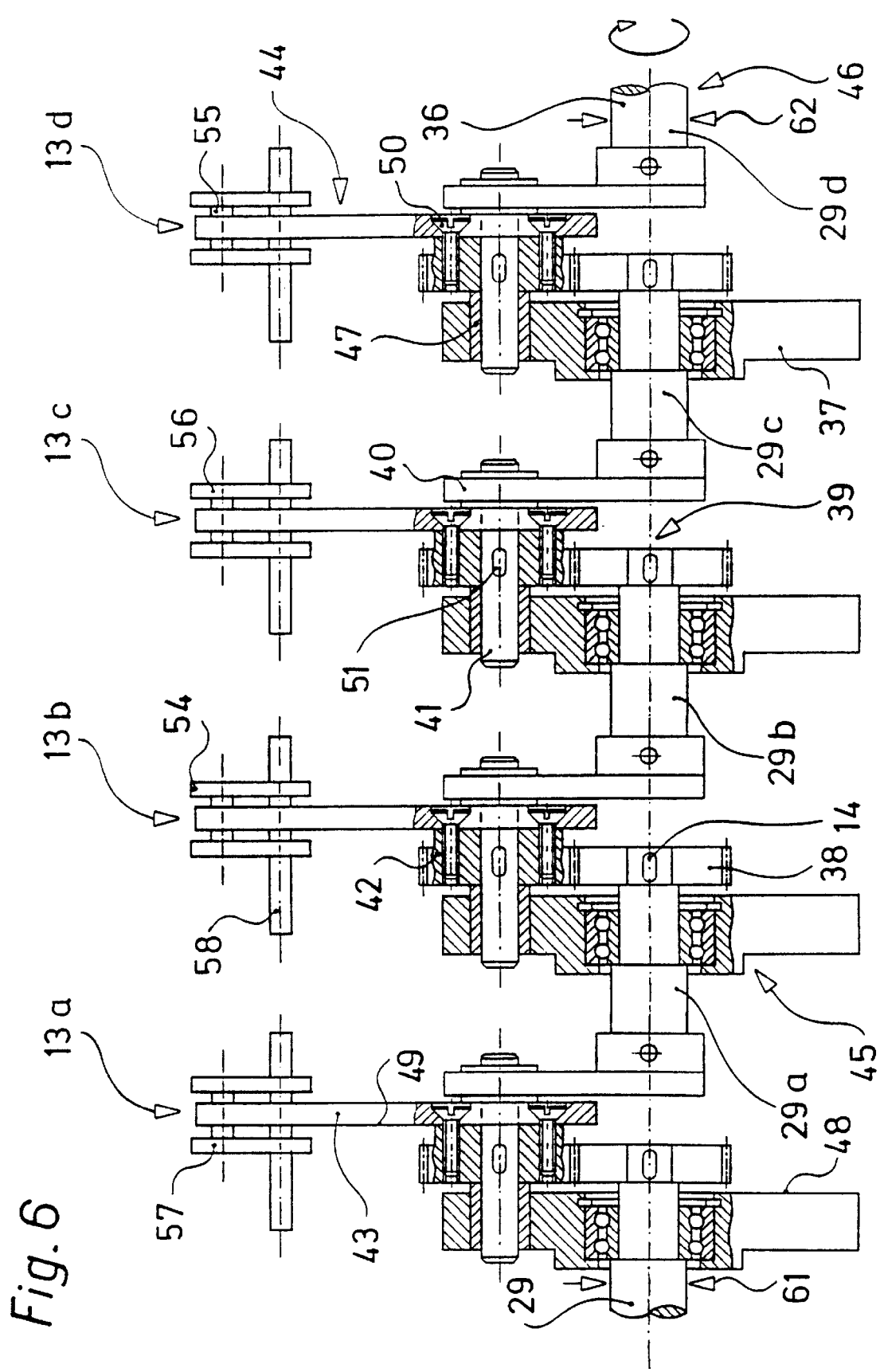
FIG. 6 is a view partly in section taken along line II/II in the FIG. 1 view looking in the direction of the arrow C, illustrating a plurality of lever drive arrangements which are arranged in succession and which overall form a rotary speed transmission.

FIG. 6 shows a plurality of, being for example as illustrated four, successively disposed lever drive arrangements 13a, 13b, 13c and 13d, rotatably supported in bearings at 61, 62, which are of the same design configuration as the lever drive arrangement 13 described with reference to figure 2, forming what is known as a rotary speed transmission. The lever rive arrangement 13a is driven for example by the shaft 29 of the crank assembly 10 which is not shown in FIG. 6. The lever drive arrangement 13a transmits the rotary movement of the shaft 29 to the shaft 29a on which the lever drive arrangement 13b is carried, while that shaft 29a transmits its rotary movement by way of the lever drive arrangement 13b to the shaft 29b. That transmission continues for example twice more, in terms of the lever drive arrangements 13c and 13d and the shafts 29c and 29d. If 29 is the shaft of the drive input in FIG. 6. then 29d would be the shaft of the drive output, or vice-versa.

A sequence of lever drive arrangements 13 as shown in FIG. 6 increases, that is to say multiplies, the input rotary speeds from a preceding lever drive arrangement to a subsequent lever drive arrangement, as follows. It will be noted here that the tooth number ratio is the ratio between the number of teeth on the rotary body 38 to the driver 42. For example: a tooth number ratio of 1:1 means that the rotary body 38 carries at its peripheral surface the same number of teeth of a geometrically identical configuration, as the driver 42. A tooth number ratio of 1:2 means that the driver 42 carries twice as many teeth of the same geometrical configuration as the rotary body 38, or vice-versa.

When, with a tooth number ratio of 1:1, the rotary body 38 on the shaft 29 performs one revolution, that results in two revolutions of the shaft 29a connected to the driver 42 by way of the drive lever 40. If the tooth number ratio is 1:2, then with one revolution of the rotary body 38, the shaft 29a of the following lever drive arrangement 13b rotates three times, while with a tooth number ratio of 1:3 it rotates four times. If lever drive arrangements involving the same tooth number ratios (for example 1:1) are connected in succession as illustrated in FIG. 6, that means that, in one revolution of the shaft 29 of the preceding lever drive arrangement 13a, the shaft 29a of the following lever drive arrangement 13b performs two revolutions. If the shaft 29 is viewed as the drive or input shaft of the lever drive arrangement 13a and the shaft 29a is considered as the driven or output shaft thereof, then a lever drive arrangement 13a with a tooth number ratio of 1:1 provides that the speed of rotation of the output shaft 29a doubles in relation to that of the drive or input shaft 29. If two lever drive arrangements 13a, 13b with the same tooth number ratio are connected in succession, then the speed of rotation of the last output shaft 29b doubles once again, and that doubling continues with the number of lever drive arrangements 13, when the tooth number ratio thereof is the same. When the tooth number ratio is 1:2, the output speed is tripled in relation to the input speed of a lever drive arrangement, and that tripling effect continues with the number of lever drive arrangements, on the assumption that the tooth number ratio of each thereof remains the same. The same applies for a factor of 4 with a tooth number ratio of 1:3.

The Table hereinafter clearly demonstrates the foregoing interrelationships having regard to the tooth number ratios and the number of lever drive arrangements.

| Tooth number ratio | Number of lever drive arrangements | Speed $sec^{-1}$ of the last lever drive arrangement |
|---|---|---|
| 1:1 | 1 | 2 |
|  | 2 | 4 |
|  | 3 | 8 |
|  | 4 | 16 |
|  | 5 | 32 |
|  | 6 | 64 |
|  | 7 | 128 |
|  | 8 | 256 |
|  | 9 | 512 |
|  | 10 | 1024 |
| 1:2 | 1 | 3 |
|  | 2 | 9 |
|  | 3 | 27 |
|  | 4 | 81 |
|  | 5 | 243 |
|  | 6 | 729 |
|  | 7 | 2187 |
|  | 8 | 6561 |
|  | 9 | 19683 |
|  | 10 | 59049 |
| 1:3 | 1 | 4 |
|  | 2 | 16 |
|  | 3 | 64 |
|  | 4 | 256 |
|  | 5 | 1024 |
|  | 6 | 4096 |
|  | 7 | 16384 |
|  | 8 | 65536 |
|  | 9 | 262144 |
|  | 10 | 1048576 |

The above-described crank assembly in accordance with the present invention can entail the following advantages:

1. The crank assembly is rendered more flexible, that is to say it is not of a seriously rigid structure, whereby forces acting thereon such as torsion and the like can be reduced in terms of a detrimental effect.

2. By virtue of suitable dimensioning of the gears involved the shaft can rotate one or more times for each complete stroke cycle, and thereby the energy involved in the context of reciprocating piston machines can be better utilised.

The piston with piston rod is very easily adjustable in relation to the crank assembly, something which is not possible with a conventional crank drive assembly.

It is possible to use standardized roller or ball bearing assemblies and that accordingly avoids the use of plain bearings with the disadvantages that they entail. By virtue of its ease of assembly and dismantling the crank assembly according to the invention avoids the manufacturing shortcomings of forged and cast crank assemblies while the lever drive arrangements make it possible to achieve variations in speed of rotation, both an increase and a reduction as desired, using simple means.

It will further be noted at this point that crank assemblies and in particular vertical-type crank assemblies can be produced in an undivided, that is to say one-piece structure, by a drop forging procedure when high loadings are to be involved or cast in a mold when lower levels of loading are expected. Forged and cast products are characterised in that, in a simple design configuration, with two coaxially extending bearing journals and a crank pin which is arranged to extend in the same direction in eccentric or spaced relationship therewith, the crank pin is so connected to the bearing journals by way of crank throws or webs, with the crank throws or webs and the crank journal forming the offset crank portion, that, when the crank assembly rotates, the crank journal moves at a spacing around the common axis of the bearing journals. Divided or split crank assemblies can also be employed, in which the component parts thereof are either pressed together or are secured together by screw means. In such an arrangement the press fits or the screw means are of such a nature that a divided or split crank assembly is technically identical in comparison with an undivided assembly. The present invention moves away from one-piece rigid crank assemblies, in which respect crank assemblies secured by screw means are to be considered as being classed among one-piece rigid assemblies, insofar as the teaching of the invention provides that crank assemblies are not of a one-piece and rigid structure but are of a multi-part structure, with the component parts mechanically co-operating with each other and thus being so-to-speak flexibilised. To put this in simplified terms, the invention replaces the rigid crank throws or webs of a conventional crank assembly by rotary carriers and gear arrangements in order thereby, co-operating by way of a support shaft with the rotary carrier, to convert the movement of the end of a piston rod along a circular path, into a rotational movement of bearing journals, which takes place about a longitudinal axis of the crank assembly. This arrangement provides that crank assembly loadings are lastingly reduced, while in addition making use of the options afforded by gear mechanisms in terms of step-up or step-down gear ratios.

It will be appreciated that the above-described embodiment of the assembly according to the invention has been set forth solely by way of example and illustration of the principles of the invention and that various modifications and alterations may be made therein without thereby departing from the spirit and scope of the invention.

What is claimed is:

1. A crank assembly for a piston machine including at least one cylinder, a piston adapted to reciprocate in the cylinder for performing stroke movements therein and a piston rod connecting the piston to a crank assembly operative for conversion between reciprocating movements of the piston in the cylinder and rotary movement of the crank assembly, the piston rod having a first end connecting it to the crank assembly and a second end connecting it to the piston the crank assembly including first and second shafts which extend in mutually coaxial relationship and each of which have oppositely disposed shaft ends leaving a spacing between said shaft ends, wherein between the shaft ends is arranged the first end of the piston-rod connecting the piston to the crank assembly supported on and movable on a circular path at a spacing around the coaxial axes of the shafts, pairs of gear wheels on both sides of the piston rod and adapted to provide rotational engagement between the piston rod and the shaft ends on both sides, wherein a lever drive means comprises a driving portion, a driven portion and an output shaft, wherein the driving portion is arranged on a shaft of said crank assembly and said driven portion is arranged on the output shaft, and wherein the shaft of the crank assembly and the output shaft are arranged in coaxial and mutually successive relationship.

2. A crank assembly as set forth in claim 1 wherein the driven portion includes a drive lever fixedly arranged on the output shaft a carrier arm having a free end, toothed drivers supported at both sides and fixedly arranged at the free end of the carrier arm, the carrier arm being in rotatable engagement with the drive lever, a mounting disk freely rotatably arranged on the shaft of the crank assembly, and a shaft trunnion portion arranged in the drive lever.

3. A crank assembly as set forth in claim 2 wherein the driving portion of the lever drive means includes a toothed rotary portion fixedly arranged on said output shaft in rotational engagement with one of said toothed drivers.

4. A crank assembly as set forth in claim 2 including a holding means wherein at the end of the carrier arm opposite to one of said toothed drivers the carrier arm is pivotably mounted to the holding means.

* * * * *